United States Patent [19]

Hoshino et al.

[11] Patent Number: 5,442,433
[45] Date of Patent: Aug. 15, 1995

[54] IDENTIFICATION SYSTEM FOR AN ARTICLE HAVING INDIVIDUALLY ATTACHED PATCHES

[75] Inventors: Hidekazu Hoshino; Hidemi Haga; Tsugutaka Sugahara, all of Kanagawa, Japan

[73] Assignee: NHK Spring Co., Ltd., Japan

[21] Appl. No.: 36,016

[22] Filed: Mar. 23, 1993

Related U.S. Application Data

[63] Continuation-in-part of Ser. No. 782,976, Oct. 24, 1991, Pat. No. 5,200,794, and a continuation-in-part of Ser. No. 788,569, Nov. 6, 1991, Pat. No. 5,291,006.

[30] Foreign Application Priority Data

Apr. 28, 1992 [JP] Japan .................. 4-137787

[51] Int. Cl.⁶ .............. G06K 7/10; G06K 19/00
[52] U.S. Cl. .......................... 356/71; 250/566; 235/454; 235/457
[58] Field of Search ........... 356/71, 383, 354–357; 250/569, 566, 570, 221; 235/454, 462, 486, 494

[56] References Cited

U.S. PATENT DOCUMENTS

| | | | |
|---|---|---|---|
| 3,536,894 | 10/1970 | Travioli | 235/61.6 |
| 3,733,862 | 5/1973 | Killmeyer | 250/556 |
| 3,735,374 | 5/1973 | Rembault | 356/71 |
| 3,761,683 | 9/1973 | Rogers | 235/61.7 |
| 3,764,978 | 10/1973 | Tyburski et al. | 340/146.3 |
| 4,023,010 | 5/1977 | Horst et al. | 235/61.11 |
| 4,034,211 | 7/1977 | Horst et al. | 235/61.12 |
| 4,094,462 | 6/1978 | Moschner | 235/419 |
| 4,129,382 | 12/1978 | Greenaway | 356/71 |
| 4,163,570 | 8/1979 | Greenaway | 283/8 |
| 4,183,665 | 1/1980 | Iannadrea et al. | 356/71 |
| 4,211,918 | 7/1980 | Nyfeler et al. | 235/454 |
| 4,298,792 | 11/1981 | Granholm et al. | 235/375 |
| 4,501,439 | 2/1985 | Antes | 283/91 |
| 4,514,085 | 4/1985 | Kaye | 356/71 |
| 4,537,504 | 8/1985 | Baltes et al. | 356/71 |
| 4,625,101 | 11/1986 | Hinks et al. | 235/462 |
| 4,659,112 | 4/1987 | Reiner et al. | 283/90 |
| 4,723,071 | 2/1988 | McGeary | 235/449 |
| 4,779,256 | 10/1988 | Koike et al. | 369/46 |
| 4,794,585 | 12/1988 | Lee | 369/112 |
| 4,855,584 | 8/1989 | Tomiyama et al. | 235/493 |
| 4,856,857 | 8/1989 | Takeuchi et al. | 350/3.6 |
| 4,858,453 | 9/1989 | Namazue | 250/221 |
| 4,950,891 | 8/1990 | Matsui | 250/237 |
| 5,004,327 | 4/1991 | Rosen | 350/398 |
| 5,010,243 | 4/1991 | Fukushima et al. | 235/488 |
| 5,034,616 | 7/1991 | Bercovitz | 250/556 |
| 5,044,707 | 9/1991 | Mallik | 359/2 |
| 5,059,776 | 10/1991 | Antes | 235/457 |
| 5,101,184 | 3/1992 | Antes | 235/454 |
| 5,200,794 | 4/1993 | Nishiguma et al. | 356/71 |
| 5,231,276 | 7/1993 | Yoshihara | 235/454 |
| 5,237,164 | 6/1993 | Takada | 235/487 |
| 5,267,753 | 12/1993 | Chock | 283/58 |
| 5,291,006 | 3/1994 | Nishiguma et al. | 250/566 |
| 5,303,214 | 4/1994 | Kulakowski et al. | 369/34 |

FOREIGN PATENT DOCUMENTS

| | | | |
|---|---|---|---|
| 2276437 | 6/1975 | France | E04C 2/32 |
| 1962274 | 12/1969 | Germany . | |
| 0268720 | 1/1988 | Germany | E04G 1/15 |
| 182580 | 2/1985 | Japan | 3/3 |
| 61-176969 | 8/1986 | Japan | G03H 1/02 |
| 1-4934 | 1/1989 | Japan | G11B 7/24 |
| 071383 | 11/1989 | Japan | 19/10 |
| 2-212193 | 8/1990 | Japan | B42D 15/10 |
| 2-261694 | 1/1991 | Japan | B42D 15/10 |
| 3-166681 | 7/1991 | Japan | G06K 19/10 |
| 1308331 | 1/1970 | United Kingdom | G06K 7/08 |
| WO93/00224 | 1/1993 | WIPO | B42D 15/10 |

Primary Examiner—Robert P. Limanek
Assistant Examiner—Alexander Oscar Williams
Attorney, Agent, or Firm—Skjerven, Morrill, MacPherson, Franklin & Friel; Allan H. MacPherson; Omkar K. Suryadevara

[57] ABSTRACT

Each identification mark consisting of hologram or diffraction grating having a unique diffractive property which can be detected with optical identification means is formed on a seal, and, by affixing such seals as a combination and reading them, the analysis or forgery of each identification mark is made highly difficult. Since the possible modes of combination and the possible number of combinations can be freely and easily selected, high levels of expandability, identification power and handling facility can be achieved at a relatively low cost. This system can be applied to various articles such as information storage cards including magnetic cards, and keys. By using the system for verifying the authenticity of the article, an effective prevention of the counterfeiting of the article can be achieved.

7 Claims, 4 Drawing Sheets

IDENTIFICATION SYSTEM FOR AN ARTICLE HAVING INDIVIDUALLY ATTACHED PATCHES

This is a continuation-in-part of U.S. patent application Ser. No. 07/782,976, filed Oct. 24, 1991, now issued as U.S. Pat. No. 5,200,794 and a continuation-in-part of U.S. patent application Ser. No. 788,569, filed Nov. 6, 1991, now issued as U.S. Pat. No. 5,291,006.

CROSS REFERENCE TO RELATED CO-PENDING APPLICATIONS

The following co-pending patent applications are directed to subject matters similar to those of the present application, and are commonly assigned to NHK Spring Co., Ltd. The contents of these applications are hereby incorporated in the present application by reference.

| Application Number | Filing Date | Remarks |
| --- | --- | --- |
| 07/547,936 | July 3, 1990 | abandoned |
| 07/782,976 | October 24, 1991 | CIP of 07/547,936 to be issued |
| 07/788,569 | November 6, 1991 | CIP of 07/547,936 |
| 07/930,583 | August 14, 1992 | |
| 07/998,067 | December 23, 1992 | |
| unknown | even date | |

1. Technical Field

The present invention relates to a system for distinguishing one article from another and identifying the authenticity of an article.

2. Background of the Invention

Conventionally, it has been practiced to print a registered trademark on goods, and to attach a seal or a patch carrying such a trademark to goods in marketing such goods, but due to the increased complexity of the distribution system, there have been cases where counterfeit goods originating from unauthorized manufacturers are sold to unwary wholesalers and retailers. The wholesalers and retailers can distinguish authentic goods by identifying the trademarks affixed to the goods, but when forged trademarks are affixed to the counterfeit goods the wholesalers and retailers are not able to identify the authenticity of the goods. It is possible to attach a bar code on the surface of each article, and use the bar code as means for identifying the authenticity of the article, but the bar code which is relatively easy to duplicate has a very limited effectiveness in identifying the authenticity of goods.

Meanwhile, substantial efforts have been directed to the prevention of the counterfeiting of various monetary papers and tickets, and multi-color printing and watermarks are often used on such articles to discourage counterfeiting and to distinguish the articles from counterfeits. However, with the recent advances in the paper processing technology and the printing technology, duplicating such multi-color printing and watermarks is made easier and less expensive. Further, the watermarks and the multi-color printing are intended for visual identification, and the counterfeits are sometimes so well made that the distinguishing capability may not be sufficient. This is particularly the case, when the design of the article has been recently changed.

In view of these facts, it was proposed, for instance in Japanese patent application No. 3-140848 by the same applicant, to affix a seal carrying identification marks which can be detected with optical identification means, sequentially impinging illuminating light upon each of the identification marks, receiving the light reflected by the identification marks, and determining the authenticity of the article according to the condition of the reflected light. According to this system, because analyzing and duplicating the specific diffractive property of the light reflecting area is so difficult in terms of cost and printing technique that the counterfeiting of the article affixed with such a seal is made highly difficult. In this case, the greater the number of the combinations of the identification marks there are, the more subtle the distinction process can be.

However, when the number of the combinations of the identification marks is too great, the number of the printing plates for the seal increases, and the printing costs tend to be increased. Due to the limitation of the size of the printing plate it has been difficult to prepare printing plates covering a large number of variations.

BRIEF SUMMARY OF THE INVENTION

In view of such problems of the prior art, a primary object of the present invention is to provide a system for article identification which allows the authenticity of the article to be identified reliably, and features low manufacturing cost.

A second object of the present invention is to provide a system for article identification which features a difficulty of forgery at low cost.

According to the present invention, these and other objects of the present invention can be accomplished by providing an article identification system, comprising: identification means provided on said article and including a plurality of patches each having a specific reflective directivity; light emitting means for impinging light emitted therefrom onto said identification means; light detecting means for detecting light reflected by said identification means; and control means for evaluating light detected by said light detecting means and determining the authenticity of said article associated with said identification means; said patches being individually affixed to said article.

Thus, by forming each identification mark as an individual patch or seal, and, by affixing such patches or seals as a combination and reading them, the possible modes of combination and the possible number of combinations can be freely increased and easily selected. Thus, the analysis or forgery of each identification mark is made very difficult, and high levels of expandability, identification power and handling facility can be achieved at a relatively low cost. Each identification mark or patch may consist of hologram or diffraction grating having a unique diffractive property which can be detected with optical identification means.

According to a preferred embodiment of the present invention, said article consists of an information storage card, and said light emitting means, said light receiving means and said control means are provided in association with a reader/writer for said information storage card. Thus, the identification means serves as means of verification of the authenticity of the card, and counterfeiting of the information card is prevented by virtue of the technical difficulty of duplicating the identification means.

According to another preferred embodiment of the present invention, said article consists of a key, and said light emitting means, said light receiving means and said control means are provided in association with a lock device which is adapted to be unlocked by said key. Thus, the mechanical part of the key may be relatively easily duplicated, but the identification means is hard to duplicate. Therefore, by using the authenticity of the identification means as a condition for opening the lock, illicit duplication of the key can be effectively prevented because duplication of the mechanical part of the key is not sufficient for opening the lock.

According to yet another embodiment of the present invention, the identification means is covered by a polarization plane rotating layer, and the light detecting means is provided with a filter which allows transmission of light whose plane of polarization is rotated by the polarization plane rotating layer. Thus, the light detecting means is made sensitive only to the light which has travelled through the polarization plane rotating layer, and insensitive to other light so that the signal to noise ratio of the identification process can be substantially improved.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
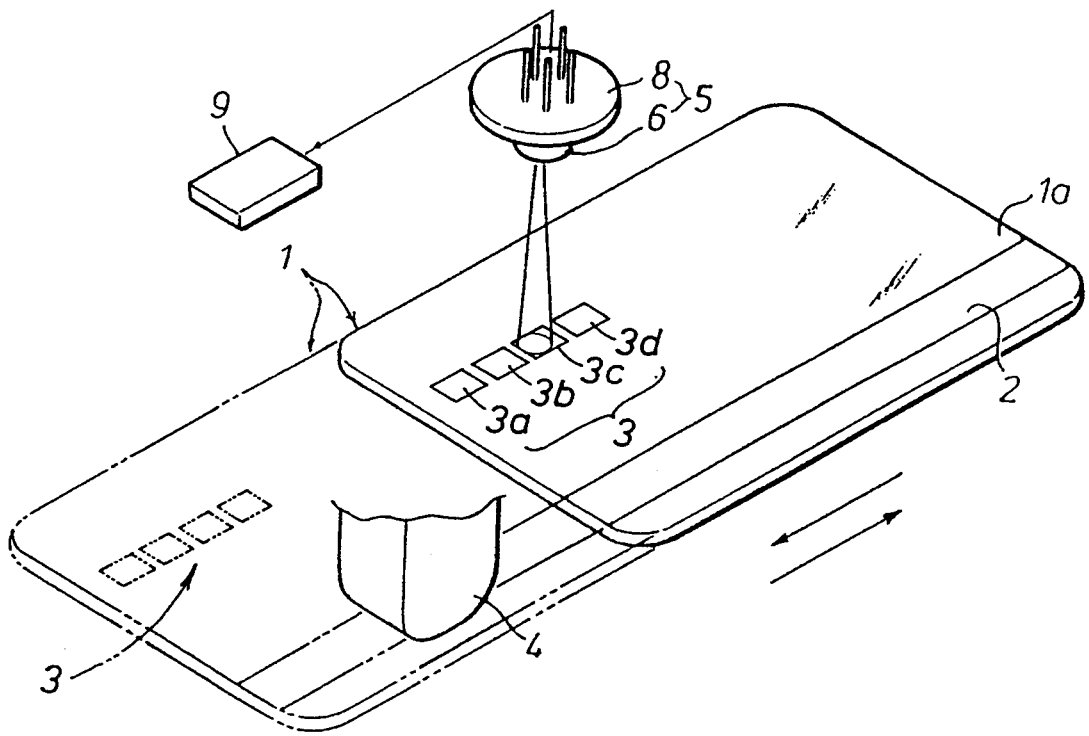
FIG. 1 is a perspective view of the structure of an essential part of a card serving as an article to be identified and an identification system for identifying the authenticity of the card given as a first embodiment of the present invention.
Figure 2:
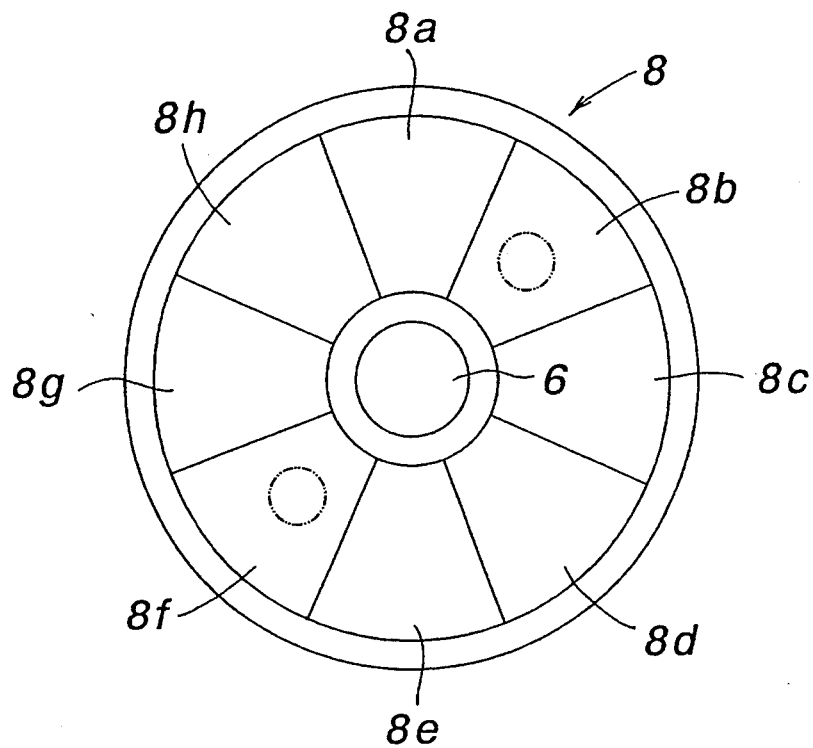
FIG. 2 is a plan view of a light emitting device and a light receiving device.
Figure 3:
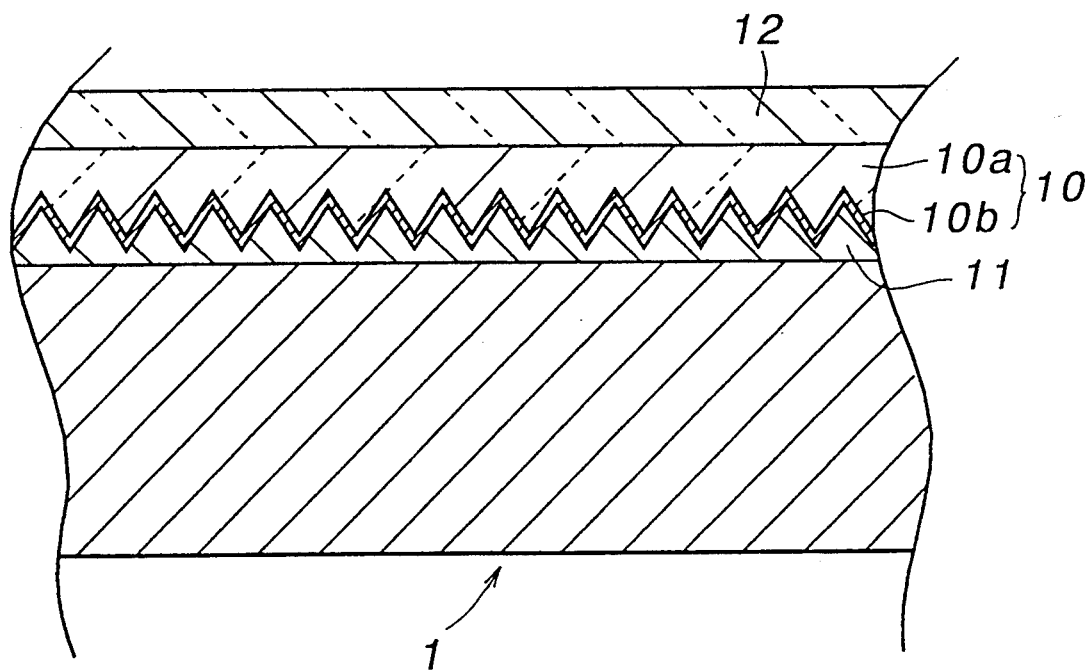
FIG. 3 is an enlarged sectional view of an identification region.

FIGS. 1 through 3 show a first embodiment of the present invention applied to a magnetic card serving as an information storage card. As illustrated in FIG. 1, a magnetic stripe extends longitudinally on a surface 1a of the card 1. Further, a plurality of (four) identification seals 3a, 3b, 3c and 3d each formed individually and each provided with an identification mark consisting of a hologram having a unique diffractive property are individually affixed to the surface as identification regions. Each seal can be individually affixed to the article. Card 1 can also be formed by affixing such patches or seals as a combination.

Meanwhile, a magnetic head 4 is provided inside a reader/writer for the card 1 so as to oppose the magnetic stripe 2 as the card 1 is conveyed in the reader/writer by a conveying unit not shown in the drawing. A light emitting/receiving unit 5 is also provided in the reader/writer so as to oppose the identification seals 3 as the card 1 is conveyed therein. This light emitting/receiving unit 5 comprises a light emitting device 6 for impinging illuminating laser light upon the identification seals 3 on the surface 1a of the card 1, and an annular light receiving device 8 surrounding this light emitting device 6 (FIG. 2). The light emitting device 6 directly opposes each of the identification seals 3a, 3b, 3c and 3d as the card 1 is conveyed. The light receiving device 8 consists of a multi-segment photodiode which is divided by radial lines into eight segments 8a through 8h each capable of individually detecting light. The light receiving device 8 is connected to a determination unit 9 which comprises a CPU, memory and an I/F circuit of known type, and determines the authenticity of the card 1.

As best illustrated in FIG. 3, the identification regions 3 each comprise a hologram layer 10 consisting of a hologram forming layer 10a and an underlying light reflecting layer 10b, and an adhesive layer 11 layered below the hologram layer 10 and serving also as a cushion layer. The surface of the hologram layer 10 is covered by a protective layer 12.

The hologram forming layer 10a transmits light while the light reflecting layer 10b diffracts the light directed to each of the identification regions 3, and reflects it onto a pair of diametrically opposing segments 8a through 8h located on either side of the light emitting device 6.

When identifying the card 1, the card 1 is sequentially conveyed to each of four positions where the light emitting device 6 of the light emitting/receiving unit 5 directly opposes a corresponding one of the identification regions 3a, 3b, 3c and 3d. The light diffracted and reflected by the identification seals 3 is received by specific segments 8a through 8h of the light receiving device 8, and information coded by the diffractive properties of the identifications seals 3a, 3b, 3c and 3d is read, and the authenticity of the card 1 is identified according to the combination. Therefore, each of the identification seals has such a reflection property that incident light having a certain wave length and projected perpendicularly is reflected in a certain prescribed direction (see U.S. Pat. No. 5,200,794).

Therefore, when this card 1 is obtained for an illicit purpose, it is not only technically extremely difficult to analyze the hologram of the identifications seals 3a, 3b, 3c and 3d, and forge them but also prohibitively expensive to carry it out, the forgery of the card is practically impossible. As it is possible to vary the combination pattern and the number of the identification seals 3a, 3b, 3c and 3d, the cost is not increased as compared to the case where a plurality of identification marks are printed on a single seal, and the effectiveness of authentic identification is improved.

It is obvious that the present invention is not limited by the above embodiment but can be implemented in various other forms. For instance, if the hologram was prepared in such a manner that the illuminating light was diffracted onto two of the segments 8a through 8h of the light receiving device 8, a but may also be prepared in such a manner that the illuminating light is diffracted onto four or more of the segments 8a through 8h of the light receiving device 8.

In the above described embodiment, the identification regions were affixed to a magnetic card 1 serving as an information storage card, but similar results can be achieved even when they are affixed to checks, promissory notes, gift certificates, and other monetary papers, and general commercial goods or the packages therefor. In this case, by placing a mask having an opening in a prescribed position over the card 1, and selecting the position of the opening so as to correspond to the identification seals affixed to the card, it is possible to identify the identification seals by using a hand-carried hand scanner. When the monetary papers are desired to be identified, although they tend to deform very easily, because the properties of hologram and diffraction grating are not substantially affected even when there is an angular deformation of, for instance, five degrees, no significant problems are created. For this reason, such identification seals can be affixed to curved parts of goods such as tennis racket handles, and can be used satisfactorily for the purpose of identifying the authenticity of the goods.

Further, a in the above described embodiment, hologram was used for the identification mark of the identification seals affixed to the card 1, similar results can be obtained when diffraction grating is used instead.

Figure 4:
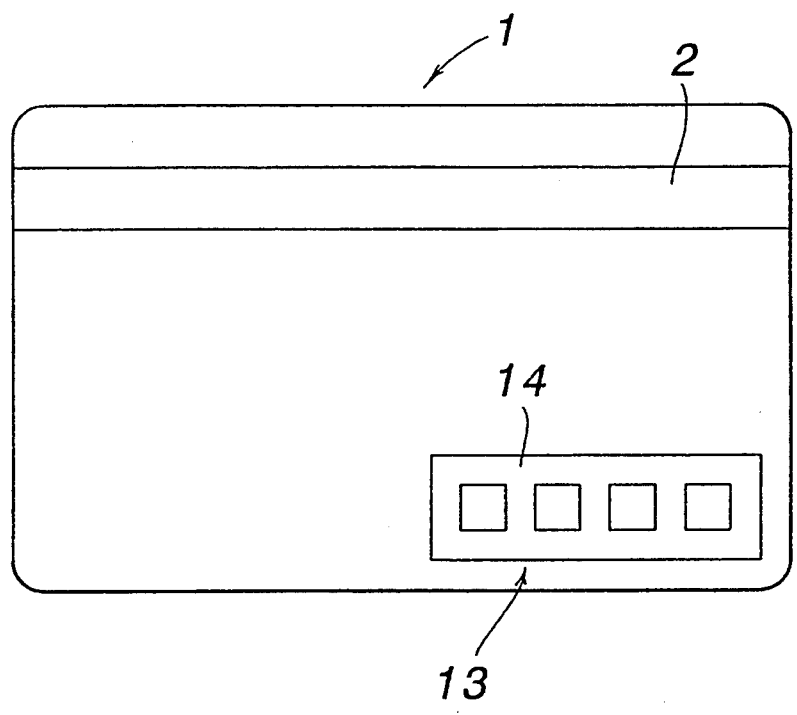
FIG. 4 is a view similar to FIG. 2 showing a second embodiment of the present invention.

FIG. 4 shows a view similar to FIG. 1 showing a second embodiment of the present invention, and the parts corresponding to those of the first embodiment are denoted with like numerals.

In the present embodiment, an identification region 13 is provided on a surface 1a of a card 1 in the same way as in the first embodiment, but the surface of the identification region is covered by a polarization film or a polarization plane rotating film 14 which rotates the direction of polarization of the illuminating laser light by 90 degrees as the light is reflected by the identification seals and travels the polarization plane rotating film 14 twice. The surface of the light receiving device 8 is covered by a polarization filter (not shown in the drawing) which allows transmission of only the light whose direction of polarization is rotated by 90 degrees. Therefore, the identification which requires the presence of the polarization plane rotating film 14 further improves the identification power over that of the identification system of the first embodiment. Otherwise, this system is similar to that of the first embodiment.

Figure 6:
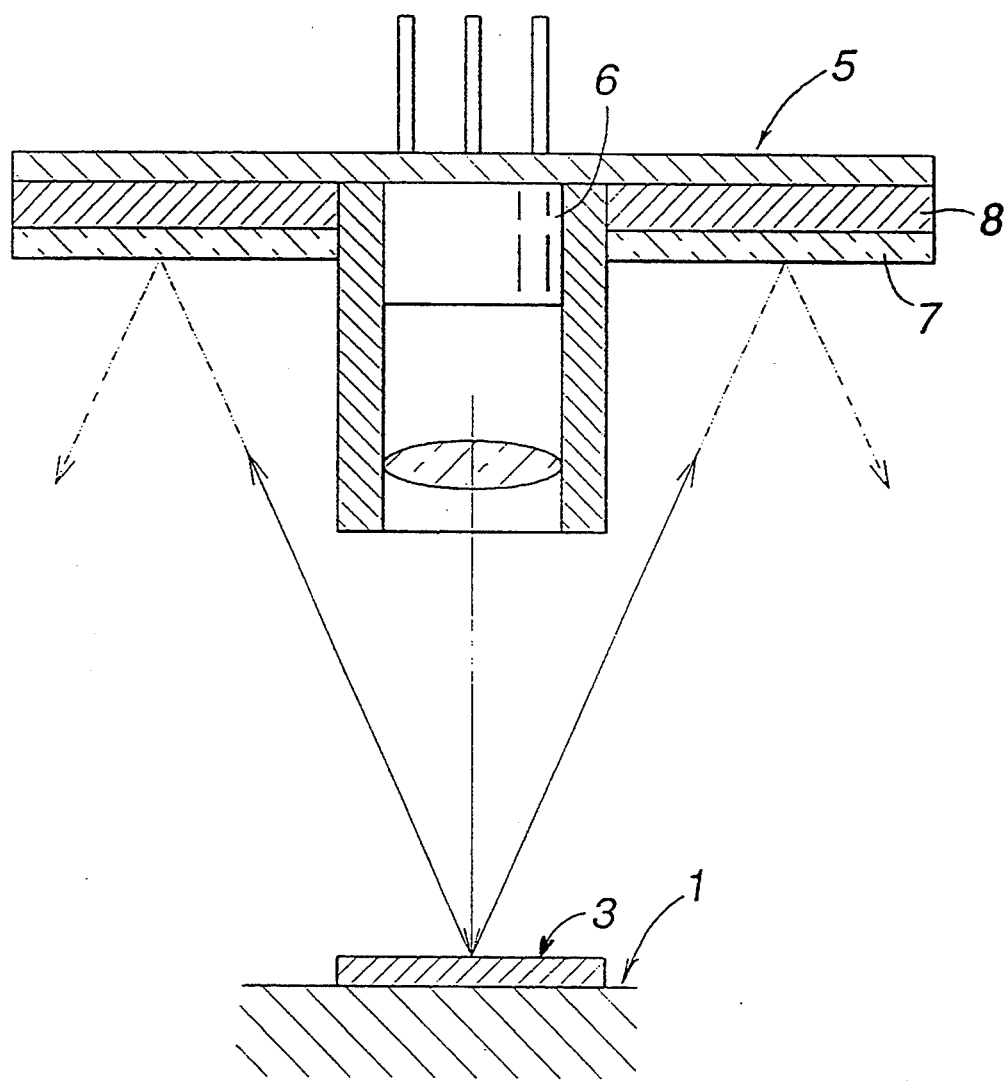
FIG. 6 is an elevation view of an identification system including a filter.

FIG. 6 shows the surface of the light receiving device 8 covered by a filter 7 allowing transmission of only the linearly polarized light having a polarization plane extending in a certain direction, more specifically perpendicular to the plane of polarization of the incident light emitted from the light emitting device 6.

Figure 5:
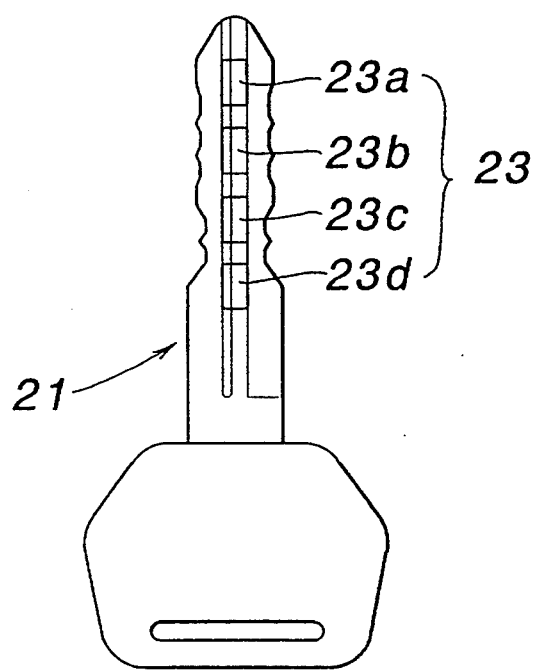
FIG. 5 is a plan view of a mechanical key serving as an article to be identified in a third embodiment of the present invention.

FIG. 5 shows a third embodiment of the present invention. According to this embodiment, an identification region 23 combining four identification seals 23a, 23b, 23c and 23d is affixed to a mechanical key of an automobile. This system improves the capability of identification by adding the means of identification using the identification region 23 in addition to the key grooves provided in the mechanical key 21.

Thus, according to the system of identifying an article, each identification mark consisting of hologram or diffraction grating having a unique diffractive property which can be detected with optical identification means is formed on a seal, and, by affixing such seals as a combination and reading them, the analysis or forgery of each identification mark is made very difficult. Since the possible modes of combination and the possible number of combinations can be freely and easily selected, high levels of expandability, identification power and handling facility can be achieved at a relatively low cost. Thus, the present invention offers a significant improvement over the prior art.

Although the present invention has been described in terms of specific embodiments thereof, it is possible to modify and alter details thereof without departing from the spirit of the present invention.

What we claim is:

1. An article identification system comprising:
   identification means provided on said article including a plurality of patches, each patch having a specific reflective directivity, each patch being formed individually;
   light emitting means for impinging light emitted therefrom onto said identification means;
   light detecting means for detecting light reflected by said identification means; and
   control means for evaluating light detected by said light detecting means and determining the authenticity of said article associated with said identification means;
   wherein each patch is individually affixed to said article.

2. An article identification system according to claim 1, wherein each patch of said plurality of patches comprises a feature selected from the group consisting of hologram and diffraction grating.

3. An article identification system according to claim 1, wherein said article comprises of an information storage card, and said light emitting means, said light detecting means and said control means are provided in association with a reader/writer for said information storage card.

4. An article identification system according to claim 1, wherein said article comprises a key.

5. An article identification system according to claim 1, wherein said identification means is covered by a polarization plane rotating layer, and said light detecting means is provided with a filter which allows transmission of .light whose plane of polarization is rotated by said polarization plane rotating layer.

6. The article identification system of claim 1 wherein said patch comprises an adhesive layer.

7. An article identification system, comprising:
   identification means provided on said article including a plurality of patches, each patch having a specific reflective directivity, each patch being formed independently of said article, each patch being formed independently of another patch of said plurality of patches;
   light emitting means for impinging light emitted therefrom onto said identification means;
   light detecting means for detecting light reflected by said identification means; and
   control means for evaluating light detected by said light detecting means and determining the authenticity of said article associated with said identification means;
   wherein said plurality of patches are affixed to said article as a combination.

* * * * *